United States Patent
Fukuda et al.

(10) Patent No.: US 11,893,824 B2
(45) Date of Patent: Feb. 6, 2024

(54) IMAGE PROCESSING DEVICE, FINGERPRINT COLLATION SYSTEM, IMAGE PROCESSING METHOD, AND RECORDING MEDIUM

(71) Applicant: NEC Corporation, Tokyo (JP)

(72) Inventors: Junichi Fukuda, Tokyo (JP); Akira Hirokawa, Tokyo (JP); Mamoru Inoue, Tokyo (JP)

(73) Assignee: NEC CORPORATION, Tokyo (JP)

(*) Notice: Subject to any disclaimer, the term of this patent is extended or adjusted under 35 U.S.C. 154(b) by 360 days.

(21) Appl. No.: 17/429,827

(22) PCT Filed: Feb. 10, 2020

(86) PCT No.: PCT/JP2020/005145
§ 371 (c)(1),
(2) Date: Aug. 10, 2021

(87) PCT Pub. No.: WO2020/166563
PCT Pub. Date: Aug. 20, 2020

(65) Prior Publication Data
US 2022/0130170 A1 Apr. 28, 2022

(30) Foreign Application Priority Data
Feb. 14, 2019 (JP) ................. 2019-024880

(51) Int. Cl.
*G06V 40/12* (2022.01)
*G06T 7/11* (2017.01)
*G06N 20/00* (2019.01)

(52) U.S. Cl.
CPC ......... *G06V 40/1347* (2022.01); *G06N 20/00* (2019.01); *G06T 7/11* (2017.01); *G06T 2207/20021* (2013.01)

(58) Field of Classification Search
CPC . G06T 7/11; G06T 2207/20021; G06T 7/543; G06T 2207/20092; G06N 20/00;
(Continued)

(56) References Cited

U.S. PATENT DOCUMENTS 10,275,677 B2 * 4/2019 Yoshida ............... A61B 5/7203
2014/0294262 A1 * 10/2014 Schuckers .......... G06V 40/1353
382/125
(Continued)

FOREIGN PATENT DOCUMENTS

| CN | 115131832 A | * | 9/2022 | ............. G06V 40/12 |
| CN | 109285204 B | * | 11/2022 | ......... G06K 9/00067 |

(Continued)

OTHER PUBLICATIONS

Machine Translation of CN-109285204-B, Sep. 2023.*
(Continued)

*Primary Examiner* — Sisay Yacob
(74) *Attorney, Agent, or Firm* — Sughrue Mion, PLLC

(57) ABSTRACT

An image processing device outputs, by using a result of machine learning, an image including three or more gradations and indicating a central line in response to an input of a fingerprint image, the machine learning being performed by using data including at least a fingerprint image, central line information indicating a central line in the fingerprint image, and zone information indicating a zone that is a portion of the fingerprint image which is effective for fingerprint collation, and generates a binary central line image based on the output image.

7 Claims, 7 Drawing Sheets

(58) Field of Classification Search
CPC ........ G06N 20/10; G06N 20/20; G06V 10/00; G06V 10/20; G06V 40/1359
See application file for complete search history.

(56) References Cited

U.S. PATENT DOCUMENTS

2017/0344846 A1* 11/2017 Yoshida ............... A61B 5/1172
2018/0204065 A1    7/2018  Pavetic et al.

FOREIGN PATENT DOCUMENTS

| GB | 2558721 A | 7/2018 | |
|---|---|---|---|
| WO | 2016104712 A1 | 6/2016 | |
| WO | 2018106987 A1 | 6/2018 | |
| WO | WO-2018106987 A1 * | 6/2018 | ......... G06K 9/00073 |

OTHER PUBLICATIONS

Machine Translation of CN-115131832-A, Sep. 2023.*
JP Office Action for JP Application No. 2022-150199, dated Aug. 22, 2023 with English Translation.
Edward Raff, "Neural Fingerprint Enhancement", 2018 17th IEEE International Conference on Machine Learning and Applications (ICMLA), 2018, p. 118-124, DOI: 10.1109/ICMLA.2018.00025.
Indian Office Action for IN Application No. 202147040913 dated Mar. 16, 2022.
European Search Report for EP Application No. 20755114.4 dated Mar. 11, 2022.
Trenkle J M: "Region of Interest Detection for Fingerprint Classification", Proceedings of SPIE, IEEE, US, vol. 2103, Oct. 13, 1993 (Oct. 13, 1993) , pp. 48-59, XP000749747, DOI: 10.1117/12.169478 ISBN: 978-1-62841-730-2.
Alijla Basem O et al: "Neural network-based minutiae extraction for fingerprint verification system", 2017 8th International Conference on Information Technology (ICIT) , IEEE, May 17, 2017 (May 17, 2017) , pp. 435-441, XP033231531, DOI: 10.1109/ICITECH. 2017.8080039.
Ali Amjad et al: "Minutiae Based Automatic Fingerprint Recognition: Machine Learning Approaches", 2015 IEEE International Conference on Computer and Information Technology; Ubiquitous Computing and Communications; Dependable, Autonomic and Secure Computing; Pervasive Intelligence and Computing, IEEE, Oct. 26, 2015 (Oct. 26, 2015) , pp. 1148-1153, XP032836108, DOI: 10.1109/CIT/IUCC/DASC/PICOM. 2015.171.
Schuch Patrick et al: "De-convolutional auto-encoder for enhancement of fingerprint samples", 2016 Sixth International Conference on Image Processing Theory, Tools and Applications (IPTA), IEEE, Dec. 12, 2016 (Dec. 12, 2016), pp. 1-7, XP033043869, DOI: 10.1109/IPTA. 2016. 7821036.
International Search Report for PCT Application No. PCT/JP2020/005145, dated Apr. 14, 2020.

* cited by examiner

IMAGE PROCESSING DEVICE, FINGERPRINT COLLATION SYSTEM, IMAGE PROCESSING METHOD, AND RECORDING MEDIUM

This application is a National Stage Entry of PCT/JP2020/005145 filed on Feb. 10, 2020, which claims priority from Japanese Patent Application 2019-024880 filed on Feb. 14, 2019, the contents of all of which are incorporated herein by reference, in their entirety.

TECHNICAL FIELD

The disclosure relates to an image processing device, a fingerprint collation system, an image processing method, and a recording medium.

BACKGROUND ART

Several technologies have been proposed in relation to fingerprint collation.

For example, the image processing device described in Patent Document 1 identifies features of a local area by comparing a first feature amount vector corresponding to a local area in an input image such as a fingerprint image with a second feature amount vector calculated from an image whose features have been determined in advance. The image processing device described in Patent Document 1, accordingly, extracts and removes, for example, an image of sweat gland pores treated as noise in fingerprint collation.

RELATED ART DOCUMENTS

Patent Documents

[Patent Document 1] Republished Japanese Translation No. WO2016/104712 of the PCT International Publication for Patent Applications

SUMMARY OF THE INVENTION

Problems to be Solved by the Invention

In view of performing fingerprint collation with high accuracy, it is desirable for feature points such as branch points or end points of a fingerprint to be able to be extracted from a fingerprint image with high accuracy. In order to increase the extraction accuracy of feature points, an image of a central line obtained by performing image processing on a fingerprint image may be manually edited in some cases. This editing operation becomes a burden for an operator and it is desirable for the burden to be able to be reduced as much as possible.

An example object of the disclosure is to provide an image processing device, a fingerprint collation system, an image processing method, and a program which can solve the problems described above.

Means for Solving the Problem

According to a first example aspect of the disclosure, an image processing device includes: a preprocessing means for outputting, by using a result of machine learning, an image including three or more gradations and indicating a central line in response to an input of a fingerprint image, the machine learning being performed by using data including at least a fingerprint image, central line information indicating a central line in the fingerprint image, and zone information indicating a zone that is a portion of the fingerprint image which is effective for fingerprint collation; and a central line image generation means for generating a binary central line image based on the image outputted by the preprocessing means.

According to a second example aspect of the disclosure, an image processing device includes: a machine learning processing means for performing machine learning by using data including at least a fingerprint image, central line information indicating a central line in the fingerprint image, and zone information indicating a zone that is a portion of the fingerprint image which is effective for fingerprint collation; a preprocessing means for outputting, by using a result of the machine learning, an image including three or more gradations and indicating a central line in response to an input of a fingerprint image; and a central line image generation means for generating a binary central line image based on the image outputted by the preprocessing means.

According to a third example aspect of the disclosure, an image processing method includes: outputting, by using a result of machine learning, an image including three or more gradations and indicating a central line in response to an input of a fingerprint image, the machine learning being performed by using data including at least a fingerprint image, central line information indicating a central line in the fingerprint image, and zone information indicating a zone that is a portion of the fingerprint image which is effective for fingerprint collation; and generating a binary central line image based on the output image.

According to a fourth example aspect of the disclosure, an image processing method includes: performing machine learning by using data including at least a fingerprint image, central line information indicating a central line in the fingerprint image, and zone information indicating a zone that is a portion of the fingerprint image which is effective for fingerprint collation; outputting, by using a result of the machine learning, an image including three or more gradations and indicating a central line in response to an input of a fingerprint image; and generating a binary central line image based on the output image.

According to a fifth example aspect of the disclosure, a recording medium stores a program that causes a computer to execute: obtaining an image by applying, to a collation target fingerprint image, processing of outputting, by using a result of machine learning, an image including three or more gradations and indicating a central line in response to an input of a fingerprint image, the machine learning being performed by using data including at least a fingerprint image, central line information indicating a central line in the fingerprint image, and zone information indicating a zone that is a portion of the fingerprint image which is effective for fingerprint collation; and generating a binary central line image based on the obtained image.

According to a sixth example aspect of the disclosure, a recording medium stores a program that causes a computer to execute: performing machine learning by using data including at least a fingerprint image, central line information indicating a central line in the fingerprint image, and zone information indicating a zone that is a portion of the fingerprint image which is effective for fingerprint collation; outputting, by using a result of the machine learning, an image including three or more gradations and indicating a central line in response to an input of a fingerprint image; and generating a binary central line image based on the output image.

Effect of the Invention

According to an example embodiment, it is possible to relatively reduce a burden on an operator who edits an image of a central line.

EXAMPLE EMBODIMENT

Hereinafter, example embodiments of the disclosure will be described, but the following example embodiments do not restrict the disclosure according to the claims. In addition, not all combinations of the features described in the example embodiments are essential to the solution of the disclosure.

Figure 1:
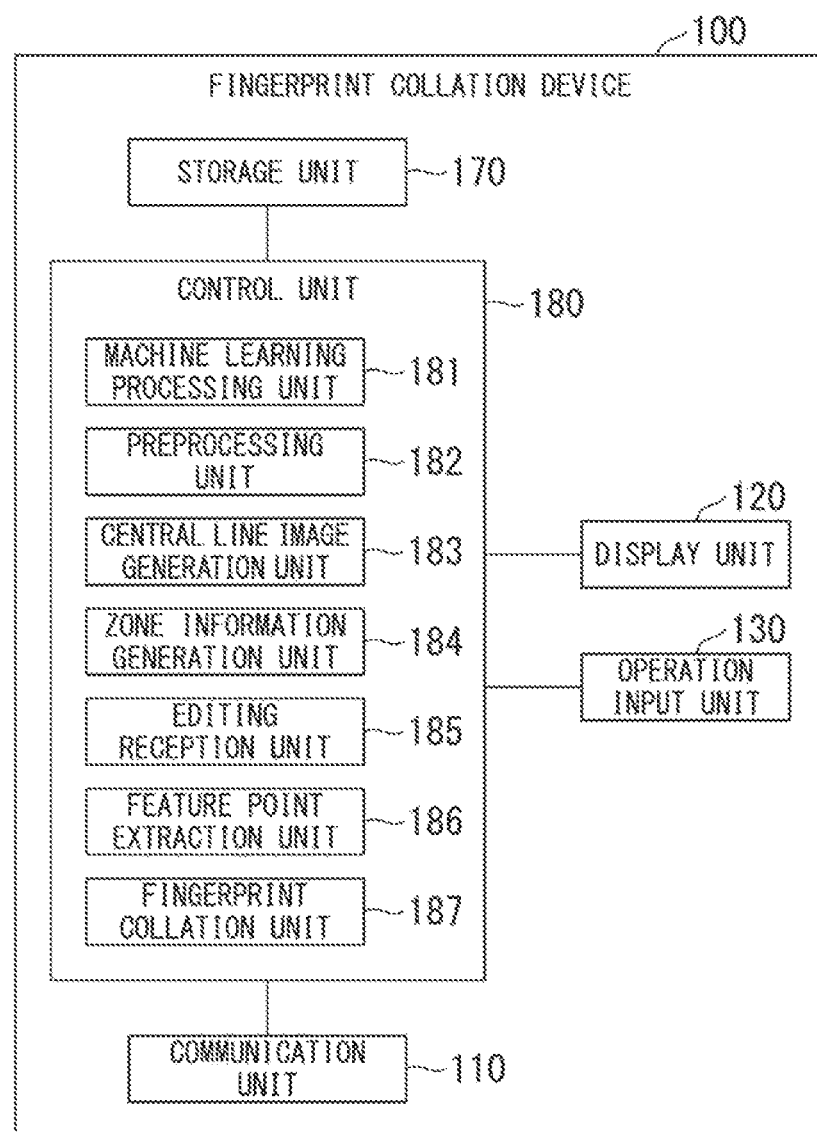
FIG. 1 is a schematic block diagram which shows an example of a functional configuration of a fingerprint collation system according to an example embodiment.

FIG. 1 is a schematic block diagram which shows an example of a functional configuration of a fingerprint collation system according to an example embodiment of the disclosure. In the configuration shown in FIG. 1, a fingerprint collation device 100 includes a communication unit 110, a display unit (display means) 120, an operation input unit (operation input means) 130, a storage unit (storage means) 170, and a control unit (control means) 180. The control unit 180 includes a machine learning processing unit (machine learning processing means) 181, a preprocessing unit (preprocessing means) 182, a central line image generation unit (central line image generation means) 183, a zone information generation unit (zone information generation means) 184, an editing reception unit (editing reception means) 185, a feature point extraction unit (feature point extraction means) 186, and a fingerprint collation unit (fingerprint collation means) 187.

The fingerprint collation device 100 receives an input of a fingerprint image and performs fingerprint collation. In particular, the fingerprint collation device 100 learns image processing as preprocessing for generating a central line image by machine learning.

A central line is a line indicating a center of a ridge in a width direction. The central line image is a binary image indicating the central line. Feature points can be extracted with higher accuracy by using the central line than using the ridge because a line width can be ignored. To improve the accuracy of the central line image, manual editing may be further performed on the automatically generated central line image. In this case, it is preferable that the accuracy of the automatically generated central line image be high to reduce a burden on an operator who performs the editing.

The fingerprint collation device 100 learns preprocessing for generating an image close to the central line image from the fingerprint image by machine learning using the fingerprint image and the central line image. Then, the fingerprint collation device 100 applies the preprocessing to the fingerprint image, and generates a central line image on the basis of the preprocessed image. The fingerprint collation device 100 generates a central line image on the basis of an image close to the central line image. Thus, according to the fingerprint collation device 100, it is possible to generate a more accurate central line image than when the central line image is generated on the basis of a raw fingerprint image (a fingerprint image on which preprocessing has not been performed). As a result, in the fingerprint collation device 100, the burden on the operator who edits the automatically generated central line image can be relatively small.

The communication unit 110 communicates with other devices. For example, the communication unit 110 receives a fingerprint image in the format of an image data from a scanner device.

In addition, the communication unit 110 may receive a fingerprint image in the format of an image data from an external server.

The display unit 120 includes, for example, a display screen such as a liquid crystal panel or a light emitting diode (LED) panel, and displays various images.

For example, the display unit 120 corresponds to an example of a selection target image display unit (selection target image display means), displays a plurality of central line images obtained by applying a plurality of algorithms to the same fingerprint image, and displays an image selected among these as an image for editing.

In addition, the display unit 120 corresponds to an example of a pre-processed image display unit (pre-processed image display means), and displays an image indicating a central line obtained by preprocessing performed by the preprocessing unit 182 and having three or more gradations.

The operation input unit 130 includes, for example, an input device such as a keyboard and a mouse, and receives a user operation.

For example, the operation input unit 130 corresponds to an example of a selection operation reception unit (selection operation reception means), and receives a user operation for selecting any one of central line image candidates for editing that is to be displayed by the display unit 120. In addition, the operation input unit 130 receives a user operation for editing a selected central line image.

The storage unit 170 stores various types of data. For example, the storage unit 170 stores an original fingerprint image for acquiring a central line image, various images in a process of generating a central line image from the fingerprint image, and information on the feature points extracted from the central line image. In addition, the storage unit 170 stores various programs executed by the fingerprint collation device 100.

Furthermore, the storage unit 170 may store fingerprint database information for fingerprint collation. The fingerprint database information includes information on feature points of each of a plurality of fingerprints to be collated. Alternatively, a device other than the fingerprint collation device 100 may store the fingerprint database information.

The storage unit 170 is configured using a storage device included in the fingerprint collation device 100.

The control unit 180 controls each unit of the fingerprint collation device 100 and executes various types of processing. A function of the control unit 180 is executed by a central processing unit (CPU) included in the fingerprint collation device 100 reading and executing a program from the storage unit 170.

The machine learning processing unit 181 learns preprocessing for generating a central line image for the fingerprint image by machine learning. Specifically, the machine learning processing unit 181 learns, as preprocessing, processing of outputting an image having three or more gradations and indicating a central line in response to an input of a fingerprint image, by performing machine learning using a fingerprint image, central line information of the fingerprint image, and zone information of this fingerprint image as learning data.

The central line information of the fingerprint image is information indicating a central line in the fingerprint image. The machine learning processing unit 181 may acquire a central line image as the central line information, but an example embodiment is not limited thereto. For example, the machine learning processing unit 181 may acquire, as the central line information, coordinate values indicating a position of the central line in the fingerprint image.

The zone information of the fingerprint image is information indicating a zone that is a portion of the fingerprint image effective for fingerprint collation. The portion which is effective for fingerprint collation is a portion in which the feature points of a fingerprint can be extracted with higher accuracy such as a portion in which the central line can be relatively clearly extracted from the fingerprint image for example. Fingerprint collation is expected to be performed with relatively high accuracy by performing fingerprint collation using the feature points in the portion which is effective for fingerprint collation.

The machine learning processing unit 181 may acquire a zone image that is a binary image indicating a zone as zone information, but an example embodiment is not limited thereto. For example, the machine learning processing unit 181 may acquire zone information indicating a portion of the fingerprint image which is effective for fingerprint collation with coordinate values of the fingerprint image.

One or both of the central line information (for example, the central line image) and the zone information (for example, the zone image) of the learning data of the machine learning processing unit 181 may be manually generated by the operator described above or the like. For example, the operator may generate the central line image by drawing the central line tracing the ridge of the fingerprint image.

A method by which the machine learning processing unit 181 performs machine learning is not limited to a specific method. For example, the machine learning processing unit 181 may perform machine learning by deep learning using a neural network, but an example embodiment is not limited thereto.

The preprocessing unit 182 applies the preprocessing on which the machine learning is performed by the machine learning processing unit 181 to a collation target fingerprint image. As a result, the preprocessing unit 182 outputs an image having three or more gradations and indicating a central line of the collation target fingerprint image. Preprocessing which has become executable by machine learning is an example of a result of the machine learning.

The image output by the preprocessing unit 182 is referred to as a pre-processed image.

The pre-processed image is, in a sense, a fingerprint image similar to a central line image in which the ridge of the input fingerprint image is thinned like a central line. While the central line image is a binary image indicating whether a central line or a non-central line, the pre-processed image is an image having three or more gradations (for example, a grayscale image). Since the pre-processed image has three or more gradations, a central line image can be obtained by treating the pre-processed image as a fingerprint image and applying a method of generating a binary central line image on the basis of the fingerprint image.

When the machine learning processing unit 181 performs machine learning by deep learning, functions of the preprocessing unit 182 may be executed using a neural network after the machine learning.

The central line image generation unit 183 generates a binary central line image on the basis of the pre-processed image obtained in the processing of the preprocessing unit 182. As the method by which the central line image generation unit 183 generates a binary central line image on the basis of the pre-processed image, various known methods for generating a central line image on the basis of a fingerprint image can be used.

The central line image generation unit 183 generates respective central line images by using a plurality of methods for generating the central line images on the basis of a fingerprint image.

The central line image generation unit 183 outputs a central line image with a pre-processed image as an input in at least one of the plurality of methods. The central line image generation unit 183 may output a central line image with a pre-processed image as an input in all of the plurality of methods. Alternatively, the central line image generation unit 183 may output a central line image with a raw fingerprint image (a fingerprint image on which the processing of the preprocessing unit 182 has not been performed) as an input in at least one of the plurality of methods. The central line image generation unit 183 may also generate respective central line images by applying the same method with each of the raw fingerprint image and the pre-processed image as an input.

The zone information generation unit 184 generates zone information of a pre-processed image on the basis of the pre-processed image obtained in the processing of the preprocessing unit 182. As describe above, the pre-processed image is a fingerprint image whose ridge is thinned like the central line. Therefore, the zone information of the pre-processed image is information indicating a zone that is a portion of the pre-processed image which is effective for fingerprint collation.

The editing reception unit 185 edits a central line image on the basis of a user operation.

Specifically, the editing reception unit 185 causes the display unit 120 to display a plurality of central line images generated by the central line image generation unit 183. Then, the editing reception unit 185 selects any one central line image according to a user operation which is received by the operation input unit 130 and selects any one of the plurality of central line images. The editing reception unit 185 causes the display unit 120 to display the selected central line image and edits the central line image according to a user operation which is received by the operation input unit 130 for editing the central line image.

The editing reception unit 185 may perform editing such that some areas of a central line image generated by a certain method are replaced with a central line image generated by another method according to a user operation which is received by the operation input unit 130, and cause the display unit 120 to display a process of the editing.

The feature point extraction unit 186 extracts the feature points of a fingerprint from the central line image edited by the editing reception unit 185.

The fingerprint collation unit 187 performs fingerprint collation on the basis of the feature points extracted by the feature point extraction unit 186. Specifically, the fingerprint collation unit 187 compares the feature points extracted by the feature point extraction unit 186 and the feature points of each fingerprint registered in the fingerprint database information. Then, the feature point extraction unit 186 selects a fingerprint whose feature points are similar at least according to a predetermined condition among the fingerprints registered in the fingerprint database information, as a fingerprint that coincides with the fingerprint to be collated. The fingerprint collation unit 187 causes, for example, the display unit 120 to display information on a selected fingerprint or information indicating that there is no selected fingerprint or coincident fingerprint. A configuration including the preprocessing unit 182 and the central line image generation unit 183 among units of the fingerprint collation device 100 is an example of a configuration of the image processing device.

Figure 2:
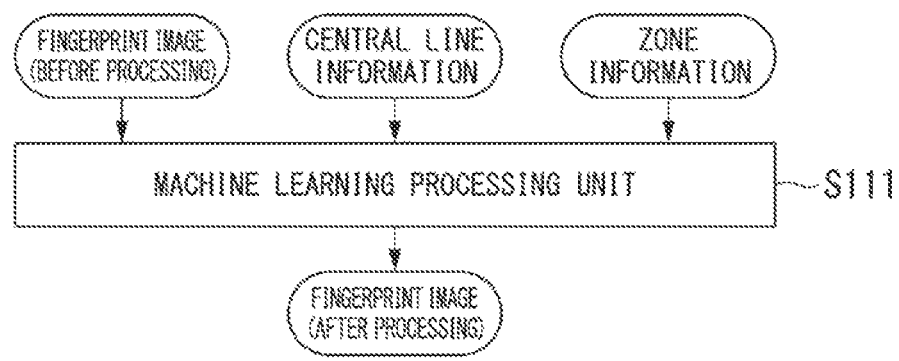
FIG. 2 is a diagram which shows an example of an input and an output of data during machine learning according to the example embodiment.

FIG. 2 is a diagram which shows an example of an input and an output of data during machine learning.

In the example of FIG. 2, the machine learning processing unit 181 receives an input of a fingerprint image before processing, central line information of the fingerprint image, and zone information of the fingerprint image as learning data, and by using the learning data, it performs machine learning on image processing for converting the fingerprint image before processing into a processed fingerprint image (step S111).

By the processing of machine learning in step S111, the machine learning processing unit 181 learns preprocessing to be performed by the preprocessing unit 182 by machine learning. Therefore, the fingerprint image before processing is associated with a raw fingerprint image that is an input to the preprocessing unit 182. The processed fingerprint image is associated with a pre-processed image that is an output from the preprocessing unit 182.

The machine learning processing unit 181 repeats machine learning of step S111 for the number of pieces of given learning data.

Figure 3:
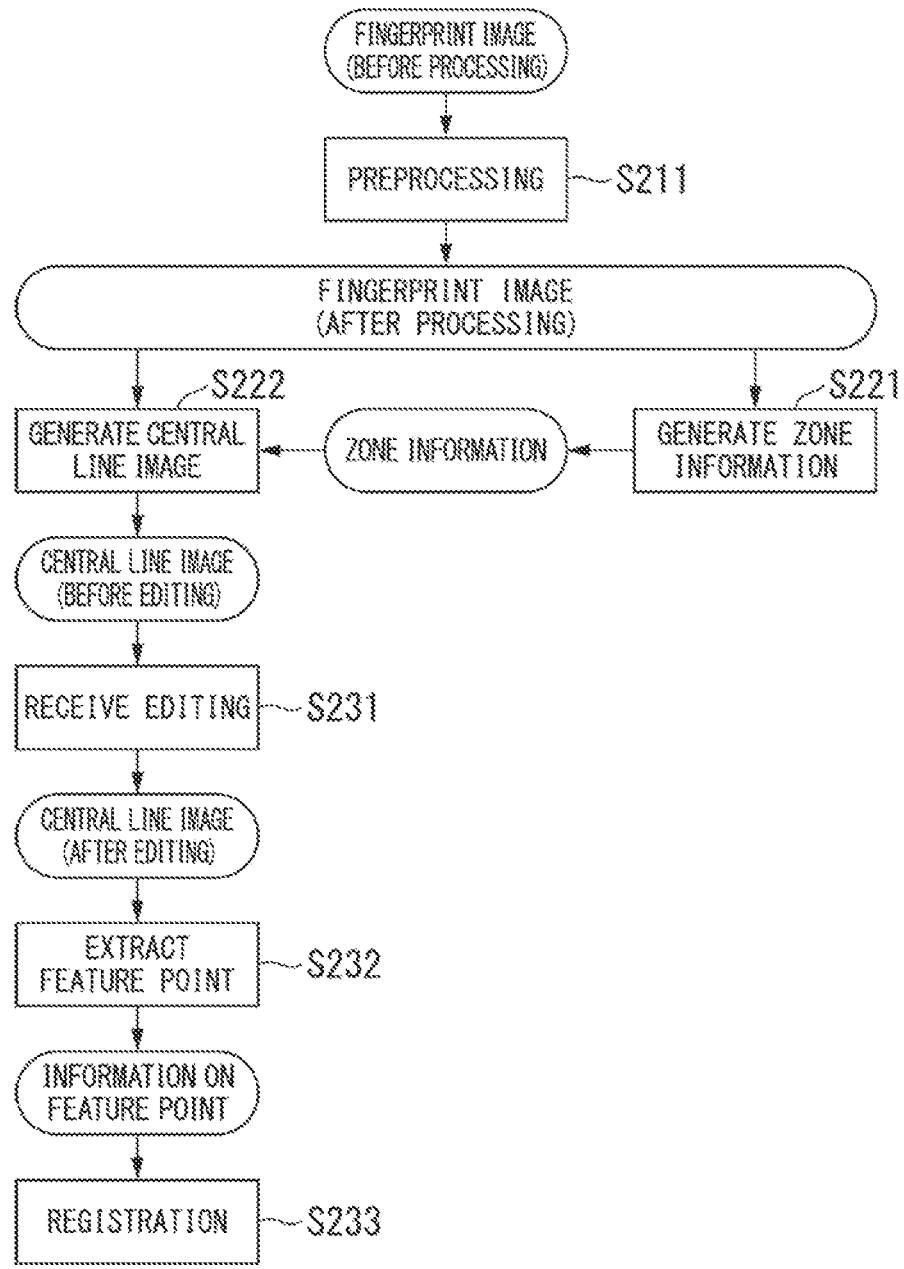
FIG. 3 is a diagram which shows an example of a processing procedure at the time of fingerprint registration according to the example embodiment.

FIG. 3 is a diagram which shows an example of a processing procedure at the time of fingerprint registration.

In the processing of FIG. 3, the preprocessing unit 182 receives an input of a fingerprint image before processing (a raw fingerprint image), and outputs a processed fingerprint image (a pre-processed image) obtained by performing preprocessing on the input fingerprint image (step S211).

The zone information generation unit 184 generates zone information of the pre-processed image using the pre-processed image (step S221).

In addition, the central line image generation unit 183 generates a central line image (step S222).

As described above, the central line image generation unit 183 generates central line images using each of a plurality of methods of generating a central line image on the basis of a fingerprint image. The central line image generation unit 183 outputs a central line image with a pre-processed image as an input in at least one method of the plurality of methods.

The central line image generated by the central line image generation unit 183 is referred to as a central line image before editing.

The editing reception unit 185 edits the central line image generated by the central line image generation unit 183 on the basis of a user operation (step S231).

As described above, the editing reception unit 185 causes the display unit 120 to display a plurality of central line images generated by the central line image generation unit 183. Then, the editing reception unit 185 selects any one of the central line images according to a user operation which is received by the operation input unit 130 for selecting any one of the plurality of central line images. The editing reception unit 185 causes the display unit 120 to display the selected central line image and edits the central line image according to a user operation that is received by the operation input unit 130 for editing the central line image.

The central line image generation unit 183 may combine a central line image, which is output with a preprocessing image as an input, and zone information into one piece of information such that the display unit 120 displays the central line image and the zone information in association with each other. For example, the central line image generation unit 183 may convert the zone information from the zone information generation unit 184 into a form of coordinate information in the central line image and combine the central line image and the zone information into one piece of information. Then, the editing reception unit 185 may cause the display unit 120 to display an image obtained by superimposing an image indicating the zone on the central line image on the basis of the combined information. FIG. 3 shows an example of input and output of data in this case.

Alternatively, the editing reception unit 185 may combine a central line image generated by the central line image generation unit 183 and zone information generated by the zone information generation unit 184, and cause the display unit 120 to display an image obtained by superimposing an image indicating the zone on the central line image.

Next, the feature point extraction unit 186 extracts the feature points of a fingerprint from a central line image after editing by the editing reception unit 185 (step S232).

When the fingerprint is registered, the feature point extraction unit 186 registers information indicating the extracted feature points in association with information indicating a fingerprint in the fingerprint database information (step S233). For example, the feature point extraction unit 186 associates the information indicating the extracted feature points with an original fingerprint image (a raw fingerprint image) and registers them in a fingerprint database. The feature point extraction unit 186 may register, in addition to or instead of the fingerprint image, information on an owner of the fingerprint such as a name of the owner of the fingerprint in the fingerprint database information in association with the information indicating a feature point.

After step S233, the fingerprint collation device 100 ends the processing of FIG. 3.

Figure 4:
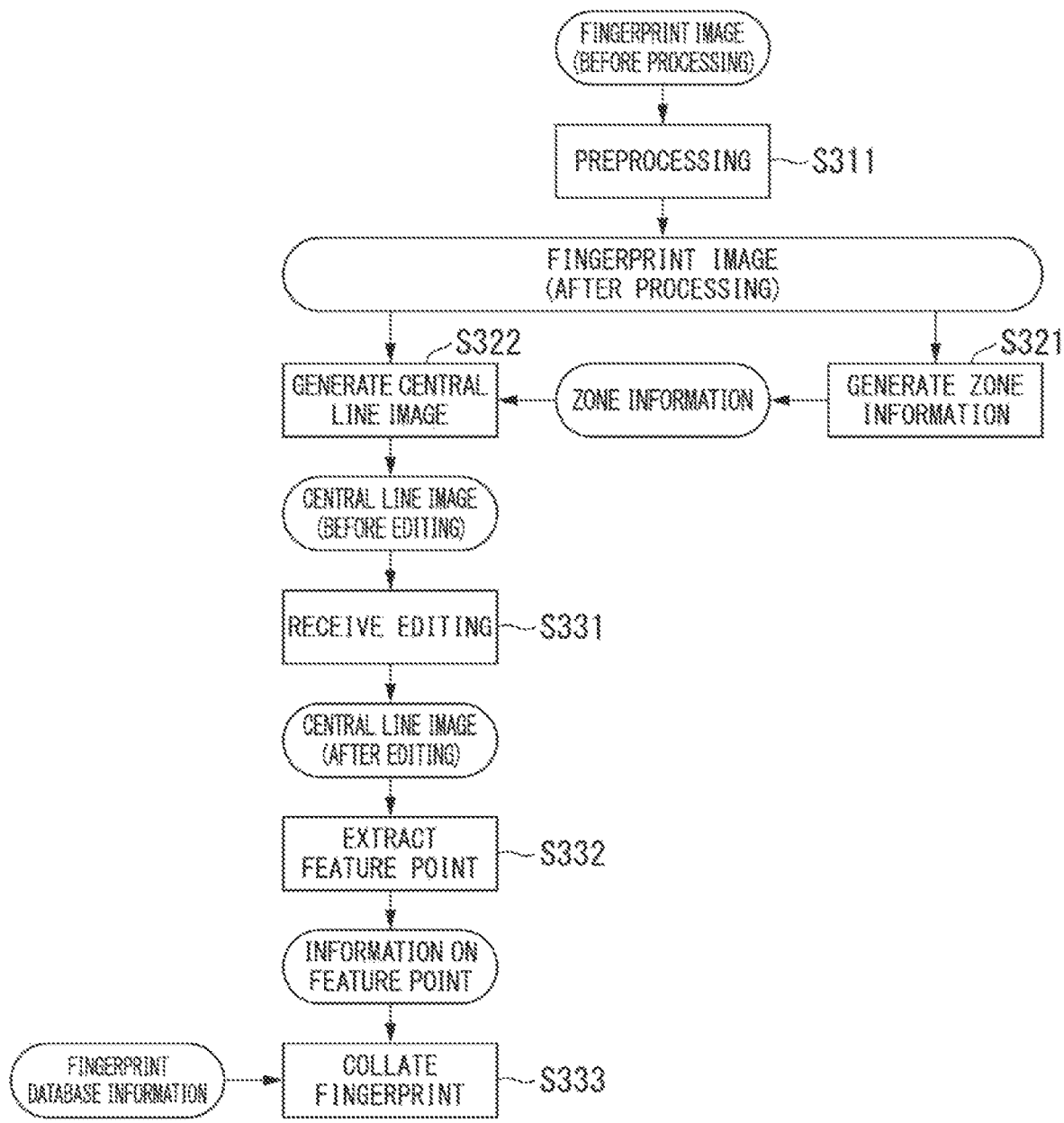
FIG. 4 is a diagram which shows an example of a processing procedure at the time of fingerprint collation according to the example embodiment.

FIG. 4 is a diagram which shows an example of a processing procedure at the time of fingerprint collation.

Steps S311 to S332 of FIG. 4 are the same as steps S211 to S232 of FIG. 3.

On the other hand, at the time of fingerprint collation, the fingerprint collation unit 187 performs fingerprint collation instead of registration of information and the like indicating feature points performed by the feature point extraction unit 186 in step S233 of FIG. 3 (step S333).

As described above, the fingerprint collation unit 187 compares the feature points extracted by the feature point extraction unit 186 with the feature points of each fingerprint registered as the fingerprint database information. Then, the feature point extraction unit 186 selects a fingerprint whose feature points are similar at least according to a predetermined condition among fingerprints registered as the fingerprint database information as a fingerprint that coincides with a fingerprint to be collated.

After step S333, the fingerprint collation device 100 ends the processing of FIG. 4.

The fingerprint collation device 100 may also be configured by a plurality of devices.

Figure 5:
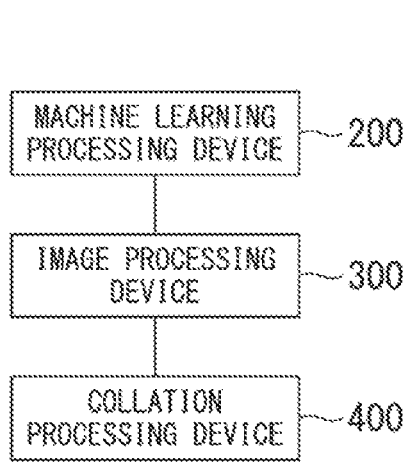
FIG. 5 is a diagram which shows an example of a device configuration of a fingerprint collation system according to the example embodiment.

FIG. 5 is a diagram which shows an example of a device configuration of a fingerprint collation system according to the example embodiment. In the configuration shown in FIG. 5, the fingerprint collation system 1 includes a machine learning processing device 200, an image processing device 300, and a collation processing device 400.

In the fingerprint collation system 1, the processing performed by the machine learning processing unit 181 is assigned to the machine learning processing device 200, and the processing performed by the fingerprint collation unit 187 is performed by the collation processing device 400. The image processing device 300 performs processing other than the processing performed by the machine learning processing unit 181 and the fingerprint collation unit 187. As a result, the fingerprint collation system 1 performs the same processing as the fingerprint collation device 100.

Figure 6:
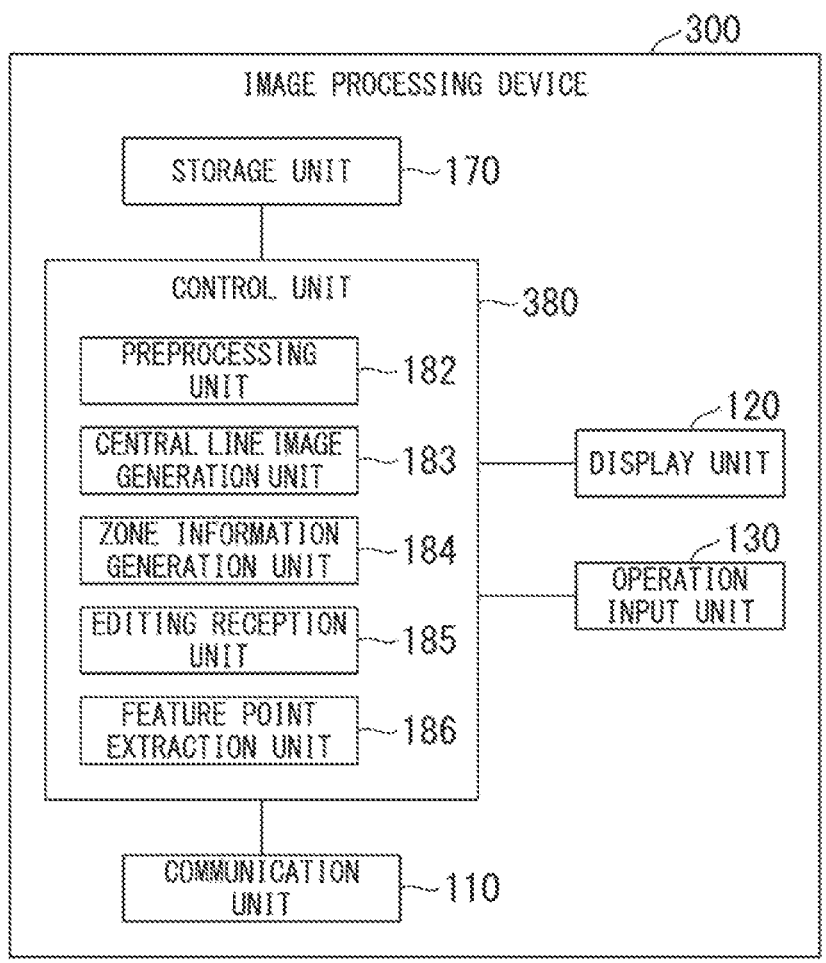
FIG. 6 is a schematic block diagram which shows an example of a functional configuration of an image processing device according to the example embodiment.

FIG. 6 is a schematic block diagram which shows an example of a functional configuration of the image processing device 300. In the configuration shown in FIG. 6, the image processing device 300 includes the communication unit 110, the display unit 120, the operation input unit 130, the storage unit 170, and a control unit (control means) 380. The control unit 380 includes a preprocessing unit 182, the central line image generation unit 183, the zone information generation unit 184, the editing reception unit 185, and the feature point extraction unit 186.

In the image processing device 300, the control unit 380, unlike the control unit 180 of the fingerprint collation device 100 (see FIG. 1), does not include the machine learning processing unit 181 and the fingerprint collation unit 187. It is because functions of the machine learning processing unit 181 are assigned to the machine learning processing device 200, and functions of the fingerprint collation unit 187 are assigned to the collation processing device 400.

Otherwise, the image processing device 300 is similar to the fingerprint collation device 100.

However, a configuration when the fingerprint collation device 100 is divided into a plurality of devices is not limited to the configuration shown in FIGS. 5 and 6. For example, a fingerprint collation system may be configured by a machine learning processing device that executes the processing of the machine learning processing unit 181 among the processing of the fingerprint collation device 100 and a fingerprint collation device that executes the other processing.

In this manner, the preprocessing unit 182 applies, to a collation target fingerprint image, processing of outputting an image having three or more gradations and indicating a central line in response to an input of the fingerprint image that has been learned by machine learning using a fingerprint image, central line information of the fingerprint image, and zone information of the fingerprint image as learning data. The central line image generation unit 183 generates a binary central line image on the basis of an image obtained in the processing of the preprocessing unit 182.

It is possible to learn preprocessing for generating an image close to the central line image from the fingerprint image by performing machine learning using a fingerprint image, central line information of the fingerprint image, and zone information of the fingerprint image as learning data. The preprocessing unit 182 performs the preprocessing on a fingerprint image and the central line image generation unit 183 generates a central line image on the basis of the image after the preprocessing (a pre-processed image), and thereby the fingerprint collation device 100 can generate a central line image on the basis of an image close to the central line image. Accordingly, the fingerprint collation device 100 can generate a central line image with higher accuracy than when a central line image is generated on the basis of a raw fingerprint image (a fingerprint image on which preprocessing has not been performed). As a result, in the fingerprint collation device 100, the burden on an operator who edits the automatically generated central line image can be relatively small.

In addition, the zone information generation unit 184 generates zone information of the pre-processed image on the basis of the image obtained by preprocessing performed by the preprocessing unit 182.

The operator who edits the central line image can set a zone (a portion used for fingerprint collation) in an edited central line image with reference to the zone information generated by the zone information generation unit 184. According to the fingerprint collation device 100, the burden on the operator can be relatively small in this regard.

In addition, the display unit 120 displays a plurality of central line images generated by a plurality of methods including a method performed by the preprocessing unit 182 and the central line image generation unit 183. The operation input unit 130 receives a user operation for selecting any one of a plurality of central line images.

Accordingly, the operator who edits a central line image can select and edit a central line image which is the most suitable for editing among the plurality of indicated central line images. As a result, the burden on the user can be relatively small.

In addition, the display unit 120 displays a pre-processed image.

The pre-processed image is an image indicating the central line in the raw fingerprint image, and the operator who edits a central line image can refer to the pre-processed image as an edition of the central line image.

In addition, the feature point extraction unit 186 extracts feature points from a central line image edited by the editing reception unit 185. The fingerprint collation unit 187 performs fingerprint collation using the extracted feature points.

According to the fingerprint collation device 100, it is possible to perform the fingerprint collation with relatively high accuracy by extracting the feature points using the edited central line image. In addition, according to the fingerprint collation device 100, the operator who edits a fingerprint image can edit the central line image generated by the central line image generation unit 183 on the basis of the pre-processed image processed by the preprocessing unit 182. The central line image generation unit 183 can generate a central line image with higher accuracy than when a central line image is generated on the basis of a raw fingerprint image (a fingerprint image on which preprocessing has not been performed), and the burden on the operator can be relatively small in this regard.

Next, configurations of the example embodiment of the disclosure will be described with reference to FIGS. 7 to 10.

Figure 7:
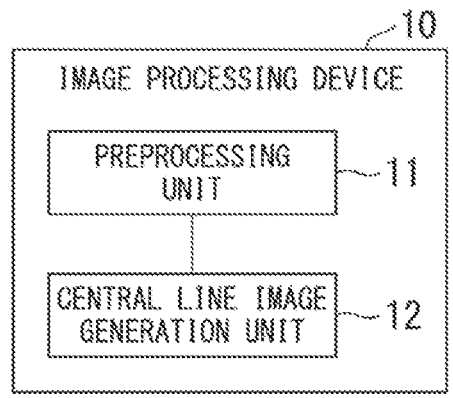
FIG. 7 is a diagram which shows an example of a configuration of an image processing device according to the example embodiment.

FIG. 7 is a diagram which shows an example of a configuration of an image processing device according to the example embodiment. An image processing device 10 shown in FIG. 7 includes a preprocessing unit (preprocessing means) 11 and a central line image generation unit (central line image generation means) 12.

In such a configuration, the preprocessing unit 11 applies, to the collation target fingerprint image, processing for outputting an image having three or more gradations and indicating the central line in response to an input of a fingerprint image which has been learned by machine learning using a fingerprint image, central line information indicating a central line in the fingerprint image, and zone information indicating a zone that is a portion of the fingerprint image, which is effective for fingerprint collation, as learning data. The central line image generation unit 12 generates a binary central line image on the basis of an image obtained by the processing of the preprocessing unit 11.

It is possible to learn preprocessing for generating an image close to a central line image from the fingerprint image by performing machine learning using a fingerprint image, central line information of the fingerprint image, and zone information of the fingerprint image as learning data. The preprocessing unit 11 performs the preprocessing on a fingerprint image and the central line image generation unit 12 generates a central line image on the basis of a preprocessed image, and thereby the image processing device 10 can generate a central line image on the basis of an image close to the central line image. Accordingly, the image processing device 10 can generate a central line image with higher accuracy than when a central line image is generated on the basis of a raw fingerprint image (a fingerprint image on which preprocessing has not been performed). As a result, in the image processing device 10, the burden on the operator who edits the automatically generated central line image can be relatively small.

Figure 8:
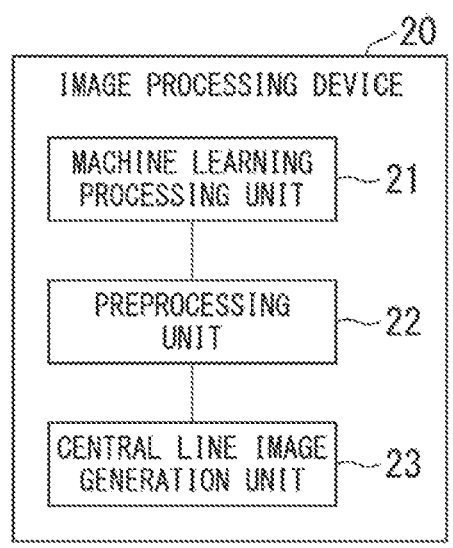
FIG. 8 is a diagram which shows another example of the configuration of the image processing device according to the example embodiment.

FIG. 8 is a diagram which shows another example of the configuration of the image processing device according to the example embodiment. An image processing device 20 shown in FIG. 8 includes a machine learning processing unit (machine learning processing means) 21, a preprocessing unit (preprocessing means) 22, and a central line image generation unit (central line image generation means) 23.

In such a configuration, the machine learning processing unit 21 learns processing for outputting an image having three or more gradations and indicating a central line in response to an input of a fingerprint image, by performing machine learning using a fingerprint image, central line information indicating a central line in the fingerprint image, and zone information indicating a zone that is a portion of the fingerprint image, which is effective for fingerprint collation, as learning data. The preprocessing unit 22 applies the machine-learned processing to the collation target fingerprint image. The central line image generation unit 23 generates a binary central line image on the basis of the image obtained in the processing of the preprocessing unit 22.

The machine learning processing unit 21 can learn preprocessing for generating an image close to the central line image from the fingerprint image by performing machine learning using a fingerprint image, central line information of the fingerprint image, and zone information of the fingerprint image as learning data. The preprocessing unit 22 performs the preprocessing on a fingerprint image and the central line image generation unit 23 generates a central line image on the basis of a preprocessed image, and thereby the image processing device 20 can generate a central line image on the basis of an image close to the central line image. Accordingly, the image processing device 20 can generate a central line image with higher accuracy than when a central line image is generated on the basis of a raw fingerprint image (a fingerprint image on which preprocessing has not been performed). As a result, in the image processing device 20, the burden on the operator who edits the automatically generated central line image can be relatively small.

Figure 9:
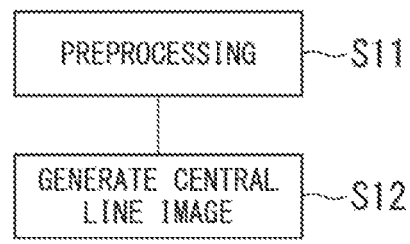
FIG. 9 is a diagram which shows an example of a processing procedure in an image processing method according to the example embodiment.

FIG. 9 is a diagram which shows an example of a processing procedure in an image processing method according to the example embodiment. The image processing method shown in FIG. 9 includes a process of performing preprocessing (step S11) and a process of generating a central line image (step S12). In step S11, the processing for outputting an image having three or more gradations and indicating a central line which has been learned by machine learning using a fingerprint image, central line information indicating a central line in the fingerprint image, and zone information indicating a zone that is a portion of the fingerprint image, which is effective for fingerprint collation, as learning data, is applied to the collation target fingerprint image. In step S12, a binary central line image is generated on the basis of the image obtained in step S11.

It is possible to learn preprocessing for generating an image close to the central line image from the fingerprint image by performing machine learning using a fingerprint image, central line information of the fingerprint image, and zone information of the fingerprint image as learning data. This preprocessing is performed on a fingerprint image in step S11 and a central line image is generated on the basis of the preprocessed image in step S12, and thereby it is possible to generate a central line image on the basis of the image close to the central line image in the image processing method of FIG. 9. Accordingly, it is possible to generate a central line image with higher accuracy in the image processing method of FIG. 9 than when a central line image is generated on the basis of a raw fingerprint image (a fingerprint image on which preprocessing has not been performed). As a result, the burden on the operator who edits the automatically generated central line image can be relatively small in the image processing method of FIG. 9.

Figure 10:
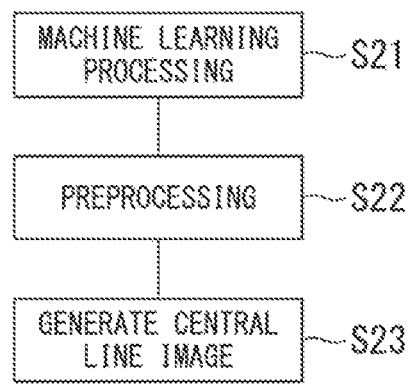
FIG. 10 is a diagram which shows another example of the processing procedure in the image processing method according to the example embodiment.

FIG. 10 is a diagram which shows another example of the processing procedure in the image processing method according to the example embodiment. The image processing method shown in FIG. 10 includes a process of performing machine learning (step S21), a process of performing preprocessing (step S22), and a process of generating a central line image (step S23). In step S21, processing of outputting an image having three or more gradations and indicating a central line in response to an input of a fingerprint image is learned by machine learning using a fingerprint image, central line information indicating a central line in the fingerprint image, and zone information indicating a zone that is a portion of the fingerprint image, which is effective for fingerprint collation, as learning data. In step S22, the processing learned in step S21 is applied to the collation target fingerprint image. In step S23, a binary central line image is generated on the basis of the image obtained in the processing of step S22.

In step S21, it is possible to learn preprocessing for generating an image close to the central line image from the fingerprint image by performing machine learning using a fingerprint image, central line information of the fingerprint image, and zone information of the fingerprint image as learning data. The processing is performed on a fingerprint image in step S22, and a central line image is generated on the basis of the preprocessed image in step S23, and thereby it is possible to generate a central line image on the basis of the image close to the central line image in the image processing method of FIG. 10. Accordingly, it is possible to generate a central line image with higher accuracy in the image processing method of FIG. 10 than when a central line image is generated on the basis of a raw fingerprint image (a fingerprint image on which preprocessing has not been performed). As a result, in the image processing method of FIG. 10, the burden on the operator who edits the automatically generated central line image can be relatively small.

Figure 11:
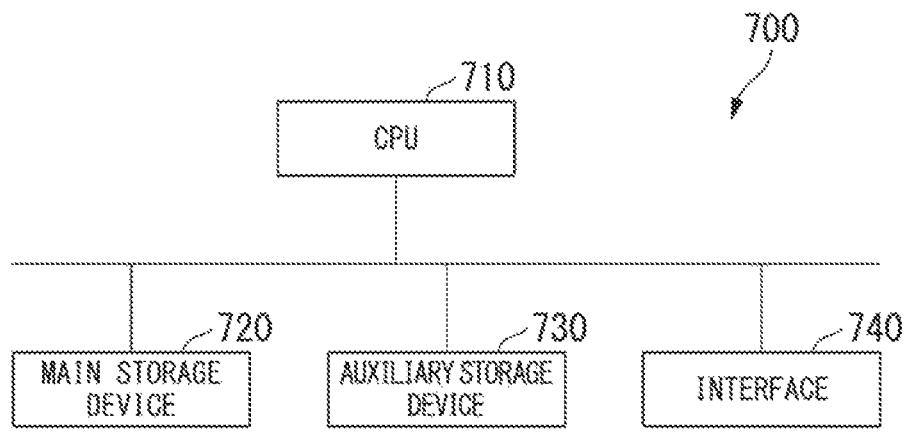
FIG. 11 is a schematic block diagram which shows a configuration of a computer according to at least one example embodiment.

FIG. 11 is a schematic block diagram which shows a configuration of a computer according to at least one example embodiment.

In the configuration shown in FIG. 11, a computer 700 includes a CPU 710, a main storage device 720, an auxiliary storage device 730, and an interface 740.

One or more of the image processing device 10, the image processing device 20, the fingerprint collation device 100, and the image processing device 300 described above may be mounted on the computer 700. In this case, an operation of each processing unit described above is stored in the auxiliary storage device 730 in a form of a program. The CPU 710 reads the program from the auxiliary storage device 730, expands it in the main storage device 720, and executes the processing described above according to the program. In addition, the CPU 710 secures a storage area corresponding to each storage unit described above in the main storage device 720 according to the program.

Communication between the image processing device 10, the image processing device 20, the fingerprint collation device 100, or the image processing device 300 and another device is executed by the interface 740 having a communication function and performing communication according to control of the CPU 710. A user interface of the image processing device 10, the image processing device 20, the fingerprint collation device 100, or the image processing device 300 is executed by the interface 740 including a display device and displaying data or including an input device and receiving data input.

When the image processing device 10 is mounted on the computer 700, operations of the preprocessing unit 11 and the central line image generation unit 12 are stored in the auxiliary storage device 730 in the form of a program. The CPU 710 reads the program from the auxiliary storage device 730, expands it in the main storage device 720, and executes the processing described above according to the program.

When the image processing device 20 is mounted on the computer 700, operations of the machine learning processing unit 21, the preprocessing unit 22, and the central line image generation unit 23 are stored in the auxiliary storage device 730 in the form of a program. The CPU 710 reads the program from the auxiliary storage device 730, expands it in the main storage device 720, and executes the processing according to the program.

When the fingerprint collation device 100 is mounted on the computer 700, operations of the control unit 180 and each unit thereof are stored in the auxiliary storage device 730 in the form of a program. The CPU 710 reads the program from the auxiliary storage device 730, expands it in the main storage device 720, and executes the processing according to the program.

In addition, the CPU 710 secures a storage area corresponding to the storage unit 170 in the main storage device 720 according to the program. Communication performed by the communication unit 110 is executed by the interface 740 having a communication function and performing communication according to the control of the CPU 710. Functions of the display unit 120 are executed by the interface 740 including a display device and displaying various images. Functions of the operation input unit 130 are executed by the interface 740 including an input device and receiving an input of data.

When the image processing device 300 is mounted on the computer 700, operations of the control unit 380 and each unit thereof are stored in the auxiliary storage device 730 in the form of a program. The CPU 710 reads the program from the auxiliary storage device 730, expands it in the main storage device 720, and executes the processing according to the program.

In addition, the CPU 710 secures a storage area corresponding to the storage unit 170 in the main storage device 720 according to the program. The communication performed by the communication unit 110 is executed by the interface 740 having a communication function and performing communication according to the control of the CPU 710. The functions of the display unit 120 are executed by the interface 740 including a display device and displaying various images. The functions of the operation input unit 130 are executed by the interface 740 including an input device and receiving an input of data.

Processing of each unit may be performed by recording a program for executing all or a part of processing performed by any one of the image processing device 10, the image processing device 20, the fingerprint collation device 100, and the image processing device 300 in a computer-readable recording medium, and causing a computer system to read and execute the program recorded in this recording medium. Note that the "computer system" herein includes hardware such as an operating system (OS) and peripheral devices.

In addition, the "computer readable recording medium" refers to a portable medium such as a flexible disk, a magneto-optical disk, a read only memory (ROM), a compact disc read only memory (CD-ROM), and a storage device such as a hard disk embedded in the computer system. Moreover, the program described above may be a program for realizing some of the functions described above, or may be a program capable of realizing the functions described above in combination with a program already recorded in the computer system.

As described above, the example embodiments of the disclosure have been described in detail with reference to the drawings. However, a specific configuration is not limited to the example embodiments, and includes a design and the like within a range not departing from the gist of the disclosure.

This application is based upon and claims the benefit of priority from Japanese patent application No. 2019-024880, filed Feb. 14, 2019, the disclosure of which is incorporated herein in its entirety by reference.

INDUSTRIAL APPLICABILITY

The disclosure may be applied to an image processing device, a fingerprint collation system, an image processing method, and a recording medium.

REFERENCE SYMBOLS

1 Fingerprint collation system
10, 20, 300 Image processing device
11, 22, 182 Preprocessing unit (preprocessing means)
12, 23, 183 Central line image generation unit (central line image generation means)
21, 181 Machine learning processing unit (machine learning processing means)
100 Fingerprint collation device
110 Communication unit (communication means)
120 Display unit (display means)
130 Operation input unit (operation input means)
170 Storage unit (storage means)
180, 380 Control unit (control means)
184 Zone information generation unit (zone information generation m
185 Editing reception unit
186 Feature point extraction unit
187 Fingerprint collation unit
200 Machine learning processing device
400 Collation processing device

What is claimed is:

1. An image processing device comprising:
at least one memory configured to store instructions; and
at least one processor configured to execute the instructions to:
output, by using a result of machine learning, an image including three or more gradations and indicating a central line in response to an input of a fingerprint image, the machine learning being performed by using data including at least a fingerprint image, central line information indicating a central line in the fingerprint image, and zone information indicating a zone that is a portion of the fingerprint image which is effective for fingerprint collation; and
generate a binary central line image based on output image.

2. The image processing device according to claim 1, wherein the at least one processor is configured to execute the instructions to: generate information indicating a zone of the output image.

3. The image processing device according to claim 1, further comprising:
display configured to display a plurality of central line images generated by a plurality of methods, the plurality of central line images including the generated central line image; and
an interface configured to receive a user operation of selecting any one of the plurality of central line images.

4. The image processing device according claim 1, further comprising:
display configured to display the output image.

5. A fingerprint collation system comprising:
the image processing device according to claim 1;
wherein the at least one processor is configured to execute the instructions to:
extract feature points from the central line image obtained by the image processing device; and
perform fingerprint collation using the extracted feature points.

6. An image processing method comprising:
outputting, by using a result of machine learning, an image including three or more gradations and indicating a central line in response to an input of a fingerprint image, the machine learning being performed by using data including at least a fingerprint image, central line information indicating a central line in the fingerprint image, and zone information indicating a zone that is a portion of the fingerprint image which is effective for fingerprint collation; and
generating a binary central line image based on the output image.

7. A non-transitory computer-readable recording medium storing a program which causes a computer to execute:
obtaining an image by applying, to a collation target fingerprint image, processing of outputting, by using a result of machine learning, an image including three or more gradations and indicating a central line in response to an input of a fingerprint image, the machine learning being performed by using data including at least a fingerprint image, central line information indicating a central line in the fingerprint image, and zone information indicating a zone that is a portion of the fingerprint image which is effective for fingerprint collation; and
generating a binary central line image based on the obtained image.

* * * * *